UNITED STATES PATENT OFFICE.

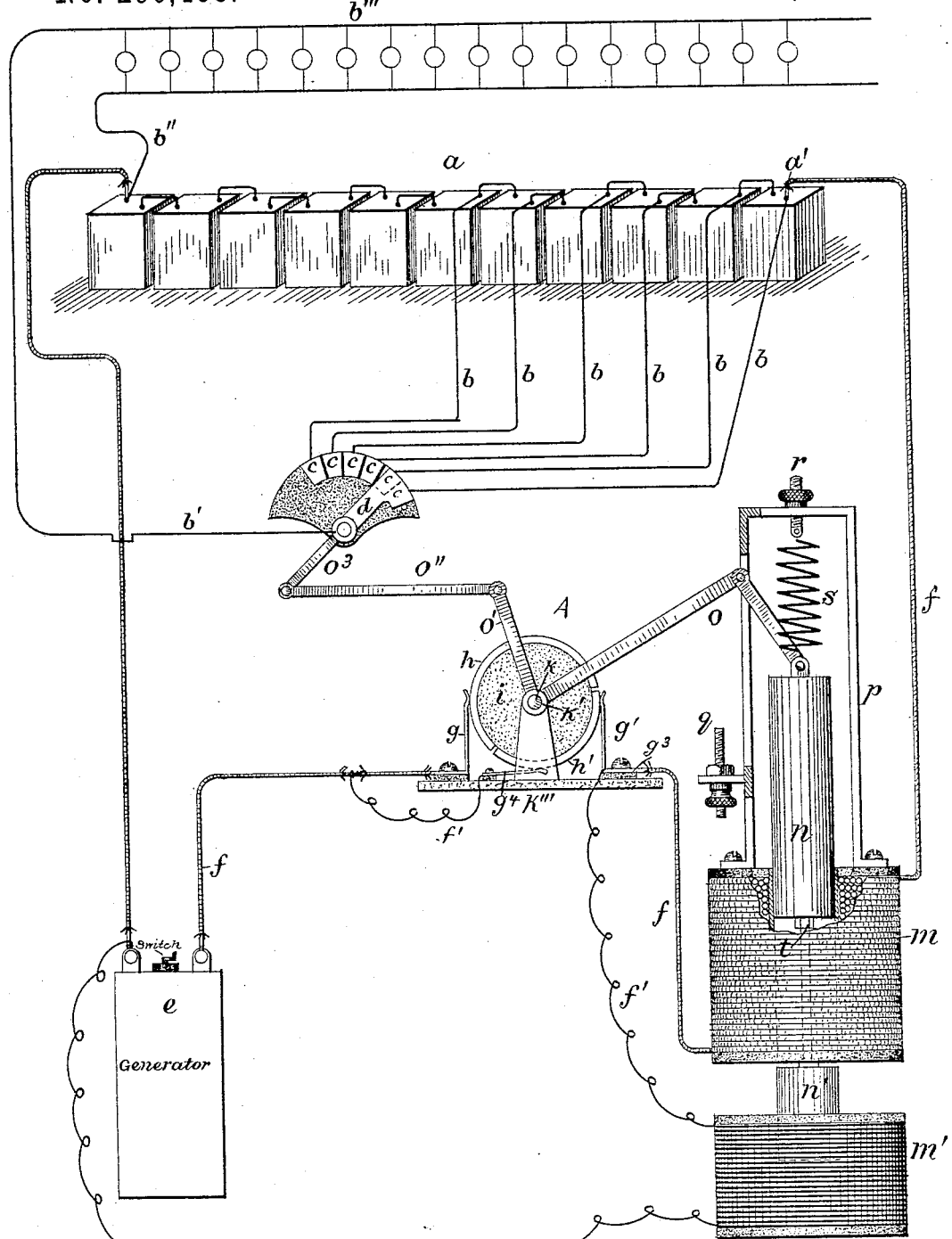
(No Model.)
C. G. PERKINS.
AUTOMATIC REGULATOR FOR STORAGE BATTERIES.
No. 290,468. Patented Dec. 18, 1883.
ATTEST:
J. A. Murdle
John F. Meyer.
INVENTOR:
Charles G. Perkins
Pr. J. A. Murdle
att'y

CHARLES G. PERKINS, OF NEW YORK, N. Y., ASSIGNOR TO THE IMPERIAL ELECTRIC LIGHT COMPANY, OF SAME PLACE.

AUTOMATIC REGULATOR FOR STORAGE-BATTERIES.

SPECIFICATION forming part of Letters Patent No. 290,468, dated December 18, 1883.

Application filed May 18, 1883. (No model.)

*To all whom it may concern:*

Be it known that I, CHARLES G. PERKINS, a citizen of the United States, and a resident of New York, in the county of New York and State of New York, have invented a certain new and useful Automatic Regulator for Storage-Batteries, of which the following is a specification.

My invention relates to an automatic electric regulator which, when connected with storage-batteries, coupled up in the usual way, and a dynamo-electric machine, will enable the generator to charge the batteries during the illumination of the lamps in the battery-circuit without interfering with the illuminating power thereof.

The first part of my invention consists of arranging a series of storage-batteries in the main circuit of a dynamo-electric machine and arranging an electro-magnet of low resistance in said electrical circuit between the dynamo-electric machine and the storage-batteries, said magnet operating a circuit closing and breaking device mechanically connected with a switch or cut-out placed in the circuit between the batteries and lamps.

The second part of my invention consists of arranging a high-resistance magnet in the derived circuit between the low-resistance magnet and the dynamo-electric machine, said high-resistance magnet operating the core of the former so as to bring the low-resistance magnet into the main circuit of the dynamo-electric machine.

The third part of my invention consists of an electro-magnet of the solenoid type, having its core connected with levers rigidly fixed to a shaft supported by bearings diametrically opposite each other, said shaft carrying an insulated disk mounted with two metallic plates on the periphery thereof, one of the plates being shorter than the other, and two upright springs bearing against the periphery of said metallic plates. Said springs are in the main circuit of the generator when they are both in contact with one and the same metallic plate.

The fourth part of my invention consists of a cut-out switch mounted on a base of insulating material, provided with metallic plates insulated from each other, each of which are separately electrically connected with a positive pole of the batteries. The aforesaid switch is mechanically connected with levers, one of which is rigidly fixed to the shaft carrying the insulated disk heretofore mentioned.

The fifth part of my invention consists of an electro-magnet of high resistance, electrically connected with the shorter metallic plate of the insulated disk heretofore mentioned. By means of one of the aforesaid upright springs said plate is electrically connected with the positive wire between the circuit-closer and generator by means of a horizontal spring, which is in constant contact with the shorter metallic plate mentioned above, and is in the derived circuit when the generator is first started. The negative end of the wire is electrically connected with the negative wire of the generator.

The sixth part of my invention consists of connecting the lower end of the core of the low-resistance magnet with the core of the high-resistance magnet by a rod. Said magnets are arranged on the same perpendicular alignment. Both cores are suspended by a retracting-spring connected with an adjusting-screw supported by a frame resting on the top of the low-resistance magnet. The frame is provided with an adjustable screw on the side thereof, which regulates the throw of the levers connected with the core of the low-resistance magnet.

In the drawing the batteries are represented as being cut out of the main circuit of the generator and are discharging a current of electricity through the incandescent lamps placed in the main circuit thereof. The machine is supposed to be at a standstill, and in this condition the circuit-closer, switch, and the controlling mechanism thereof are in their normal positions.

Similar letters refer to similar parts throughout the drawing, in which—

*a* represents the storage-batteries; *b*, the conductors electrically connected with the metallic plates *c*, one of which is at all times in contact with the switch-spring *d* whenever the generator is not in use. The remaining ends of the conductors $b$ are connected with the positive poles of the batteries.

$b'$ is the line-wire, electrically connected with the aforesaid switch-spring $d$; $b''$, the negative line-wire of the series of storage-batteries $a$.

$b'''$ are the incandescent lamps in multiple arc, placed in the main circuit of the batteries $a$.

$e$ is the generator, and $f$ is the main positive conductor extending therefrom to the upright spring $g$, forming a part of the circuit-closer A, to which it is electrically connected. Said spring $g$ is in constant contact with the metallic plate $h$, mounted on the insulated disk $i$, which is rigidly fixed to the shaft $k$, resting on bearings $k'$, arranged opposite each other and supported by an insulated base, $k'''$.

$g'$ is the second upright spring, which is brought in contact with the metallic plate $h$ when closing the main circuit of the generator. The upright spring $g'$ is electrically connected with the main-circuit wire $f$ at $g^2$. Said wire $f$ forms the helix of the low-resistance magnet $m$, and extends therefrom to the positive pole of the batteries $a$ at $a'$.

$n$ is the core of the low-resistance magnet connected with the levers $o$, which are rigidly fixed to the shaft $k$.

$o'$ is a lever, which is also rigidly fixed to the shaft $k$. Said lever $o'$ is connected with two other levers, $o''$ $o^3$. The latter is connected with the switch-spring $d$.

$p$ is the frame, provided with the adjusting-screw $q$, and is set to regulate the throw of the levers $o$.

$r$ is the adjusting-screw, having the spring $s$ connected therewith, said spring suspending the core $n$, connected with the core $n'$ by means of the rod $t$. The core $n'$ is operated by the high-resistance magnet $m'$. One end of the wire $f'$, forming the helix thereof, is electrically connected with the spring $g'$, which bears against the short metallic plate $h'$, which is at all times in contact with the horizontal spring $g^4$, electrically connected with the high-resistance wire $f'$, leading therefrom to the positive wire $f$, with which it is also electrically connected. The negative end of the wire forming the helix of the high-resistance magnet is electrically connected with the negative wire of the generator.

Mode of operation: The lamps are now burning and the storage-batteries have nearly exhausted themselves, consequently it becomes necessary to recharge them, and at the same time allowing the lamps to continue their illumination. To accomplish this the machine is started, and being of the shunt-wound type will enable the field-magnets to become magnetized slowly. The current then flows through the conductor $f'$ to the spring $g^4$, thence to the plate $h'$, to the spring $g'$, from which it passes to the wire forming the high-resistance magnet back to the negative main-line wire of the machine, the result of which causes the magnet to draw down the core $n'$, which necessarily carries the core $n$ with it, and in doing so the levers $o$ descend and turn the insulated disk $i$ until the metallic plate $h$ comes in contact with the spring $g'$, the result of which breaks the shunt-circuit and closes the main circuit. The current then passes through the positive wire $f$ to the spring $g$, to the plate $h$, thence to the spring $g'$, to the wire forming the helix of the low-resistance magnet $m$, through which it passes to and through the batteries back to the generator. The electro-motive force of the generator is greater than that of the batteries. Consequently the increasing current of the generator will cause the core $n$ to descend, carrying with it the levers $o$, which movement causes the disk $i$ to turn, thereby carrying the levers $o'$ $o''$ $o^3$ with it, the result of which swings the switch-spring $d$ around until a sufficient number of batteries shall have been cut out of the battery-circuit, whereby the electro-motive force is regulated. Whenever the batteries shall have been properly charged, the circuit of the generator is broken by turning a switch commonly used on electric-dynamo machines. This operation prevents any part of the battery-current from affecting the generator. After the circuit of the generator shall have been broken, as stated above, the mechanism controlling the circuit-closer and switch will have assumed their normal position, after which the machine is stopped.

Having thus described my invention, what I claim as new, and desire to secure by Letters Patent, is—

1. The combination of a series of storage-batteries and a generator of electricity, the circuit-closer in the main electrical circuit between the generator and batteries, said circuit-closer closing and opening the circuit automatically by means of electro-magnets in the main electrical circuit of the generator, and a circuit-closing switch and cut-out in the lamp-circuit of the batteries, said circuit-closing switch and cut-out suitably connected with the aforesaid circuit-closer of the generator-circuit, so as to be operated automatically and simultaneously therewith, thereby causing it to cut out a number of the batteries, in accordance with the electro-motive force of the generator.

2. In combination with a generator of electricity, and a series of storage-batteries, a circuit-closer in the main electrical circuit of a generator, said circuit-closer adapted to be operated automatically by electro-magnets, one of which is in the main circuit of the generator, the other in the derived circuit thereof, the whole connected and operating automatically and simultaneously with a circuit-closing switch and cut-out engaging with a series of metallic plates electrically connected with one pole of each battery, the whole forming a complete device for regulating the current charging the storage-batteries during the illumination of the lamp in the battery-circuit.

3. In an automatic circuit-closer and circuit-closing switch and cut-out, the combination, substantially as shown and described, of the storage-batteries $a$, generator $e$, contact-spring $g$, metallic plates $h$ $h'$, disk $i$, contact $g'$ $g^4$, electro-magnets $m$ $m'$, core $n'$, spring $s$, screw $r$, frame $p$, regulating-screw $q$, levers $o$, shaft $k$, levers $o'$ $o''$ $o^3$, circuit-closing switch, and cut-out $d$, conductor $b'$, metallic plates $c$, and conductors $b$, all forming a complete device for the purpose herein set forth.

4. In combination with a circuit-closer operated automatically by electro-magnets, both in the main electrical circuit between the generator and a series of storage-batteries, a circuit-closing switch and cut-out in the lamp-circuit of the batteries, said circuit-closing switch and cut-out connected with the aforesaid circuit-closer of the generator-circuit by means of levers, so as to be controlled thereby and operated automatically therewith, said circuit-closing switch and cut-out engaging with metallic plates, each of which is electrically connected with a pole of the batteries.

5. In combination with an automatic circuit-closer in the main electrical circuit between a generator and a series of storage-batteries, the circuit-closing switch and cut-out $d$, levers $o^3$ $o''$ $o'$, metallic plates $c$, conductors $b$ and $b'$, substantially as shown and described.

6. In combination with a series of storage-batteries having an automatic circuit-closing switch and cut-out in the main electrical circuit thereof, a circuit-closer operated automatically by electro-magnets, one of which is in the main circuit between a series of storage-batteries and generator, the other placed in the derived circuit thereof.

7. In combination with a series of storage-batteries having a switch in the discharging-circuit of the battery and the connecting-links $o'$ $o''$ $o^3$, the levers or links $o$, the springs $g$, $g'$, and $g^4$, and the circuit-connections $f$ $f'$, metallic plates $h$ $h'$, insulated disk $i$, shaft $k$, electro-magnet $m$ $m'$, cores $n$ $n'$, spring $s$, screw $r$, frame $p$, adjusting-screw $q$, substantially as shown and described.

Signed at New York, in the county of New York and State of New York, this 14th day of May, A. D. 1883.

CHARLES G. PERKINS.

Witnesses:
  J. A. HURDLE,
  GEORGE BECKER.